(12) United States Patent
Lingafelt et al.

(10) Patent No.: US 10,528,994 B2
(45) Date of Patent: Jan. 7, 2020

(54) ALLOCATION OF APPLICATION LICENSES WITHIN CLOUD OR INFRASTRUCTURE

(75) Inventors: Steven Lingafelt, Durham, NC (US); James W. Murray, Durham, NC (US); James Swantek, Canton, GA (US); James S. Worley, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 1266 days.

(21) Appl. No.: 13/433,393

(22) Filed: Mar. 29, 2012

(65) Prior Publication Data

US 2013/0262250 A1    Oct. 3, 2013

(51) Int. Cl.
*G06Q 30/06*    (2012.01)

(52) U.S. Cl.
CPC .................. *G06Q 30/06* (2013.01)

(58) Field of Classification Search
CPC ...... G06F 3/0631; G06F 3/0665; G06Q 30/06
See application file for complete search history.

(56) References Cited

U.S. PATENT DOCUMENTS

| | | | |
|---|---|---|---|
| 5,845,065 A * | 12/1998 | Conte .................. | G06F 21/105 726/31 |
| 6,763,098 B1 * | 7/2004 | Allen et al. .............. | 379/144.03 |
| 7,536,356 B2 | 5/2009 | Eng | |
| 7,702,903 B1 | 4/2010 | Roy et al. | |
| 7,703,142 B1 | 4/2010 | Wilson et al. | |
| 7,870,153 B2 * | 1/2011 | Croft .................... | G06F 3/1415 707/694 |
| 2002/0026478 A1 * | 2/2002 | Rodgers et al. .............. | 709/205 |
| 2004/0078339 A1 | 4/2004 | Goringe et al. | |
| 2004/0260589 A1 * | 12/2004 | Varadarajan et al. ............ | 705/8 |
| 2005/0049973 A1 | 3/2005 | Read et al. | |
| 2006/0015466 A1 * | 1/2006 | Noioso ................... | G06F 21/10 705/59 |
| 2006/0265489 A1 | 11/2006 | Moore | |
| 2007/0005505 A1 | 1/2007 | D'Alo et al. | |
| 2007/0204153 A1 * | 8/2007 | Tome et al. ................... | 713/164 |
| 2008/0082448 A1 | 4/2008 | Meijer et al. | |
| 2008/0082450 A1 * | 4/2008 | Grimm et al. .................. | 705/59 |
| 2008/0083025 A1 | 4/2008 | Meijer et al. | |
| 2008/0083040 A1 | 4/2008 | Dani et al. | |
| 2008/0091613 A1 | 4/2008 | Gates et al. | |

(Continued)

OTHER PUBLICATIONS

Ejarque, et al, "Job Scheduling with License Reservation: Semantic Approach," PDP 19th Euromicro International Conference, Feb. 9-11, 2011, pp. 47-54.

(Continued)

*Primary Examiner* — Jacob C. Coppola
(74) *Attorney, Agent, or Firm* — Cahn & Samuels, LLP (57) ABSTRACT

A method for allocation of application licenses includes establishing a computing environment comprising a licensed application or service accessed by at least two users, each user having an associated computer system; establishing an ordered list of users for a licensed application or service, in which users have a predefined priority based on a business value or function; establishing at least one user attribute comprising whether a user's virtual machine will be archived and saved for later resumption if the user's license is at least one of suspended, removed, or reallocated; and establishing at least one disqualification threshold for at least one user.

10 Claims, 10 Drawing Sheets

(56) References Cited

U.S. PATENT DOCUMENTS

| | | | |
|---|---|---|---|
| 2008/0306786 A1 | 12/2008 | Lonoeski et al. | |
| 2009/0133099 A1 | 5/2009 | Varadarajan | |
| 2009/0232289 A1 | 9/2009 | Drucker et al. | |
| 2009/0276771 A1 | 11/2009 | Nickolov et al. | |
| 2010/0058447 A1* | 3/2010 | Wang | 726/4 |
| 2010/0205303 A1 | 8/2010 | Chaturvedi et al. | |
| 2010/0325022 A9* | 12/2010 | Ben-Yaacov et al. | 705/30 |
| 2011/0010216 A1 | 1/2011 | Bhogal et al. | |
| 2011/0072431 A1 | 3/2011 | Cable et al. | |
| 2011/0093371 A1 | 4/2011 | Clemm et al. | |
| 2011/0137805 A1* | 6/2011 | Brookbanks | G06F 9/5072 705/80 |
| 2011/0307573 A1 | 12/2011 | Lingafelt et al. | |
| 2012/0059917 A1* | 3/2012 | Dawson | G06F 9/5055 709/223 |
| 2012/0102493 A1* | 4/2012 | Allen et al. | 718/101 |
| 2012/0209946 A1* | 8/2012 | McClure et al. | 709/217 |

OTHER PUBLICATIONS

IBM, et al., "Method to Do Cost Aware Application Provisioning in a Cloud Environment Based on Licensing Cost," IPCOM000194968D, Apr. 16, 2010.

* cited by examiner

ALLOCATION OF APPLICATION LICENSES WITHIN CLOUD OR INFRASTRUCTURE

BACKGROUND

The present invention relates to application licenses within a cloud or other infrastructure, and more specifically, to a system and methods for allocation or reallocation of application licenses within a cloud or other infrastructure based on a defined priority of users according to a business function or value.

Figure 1:
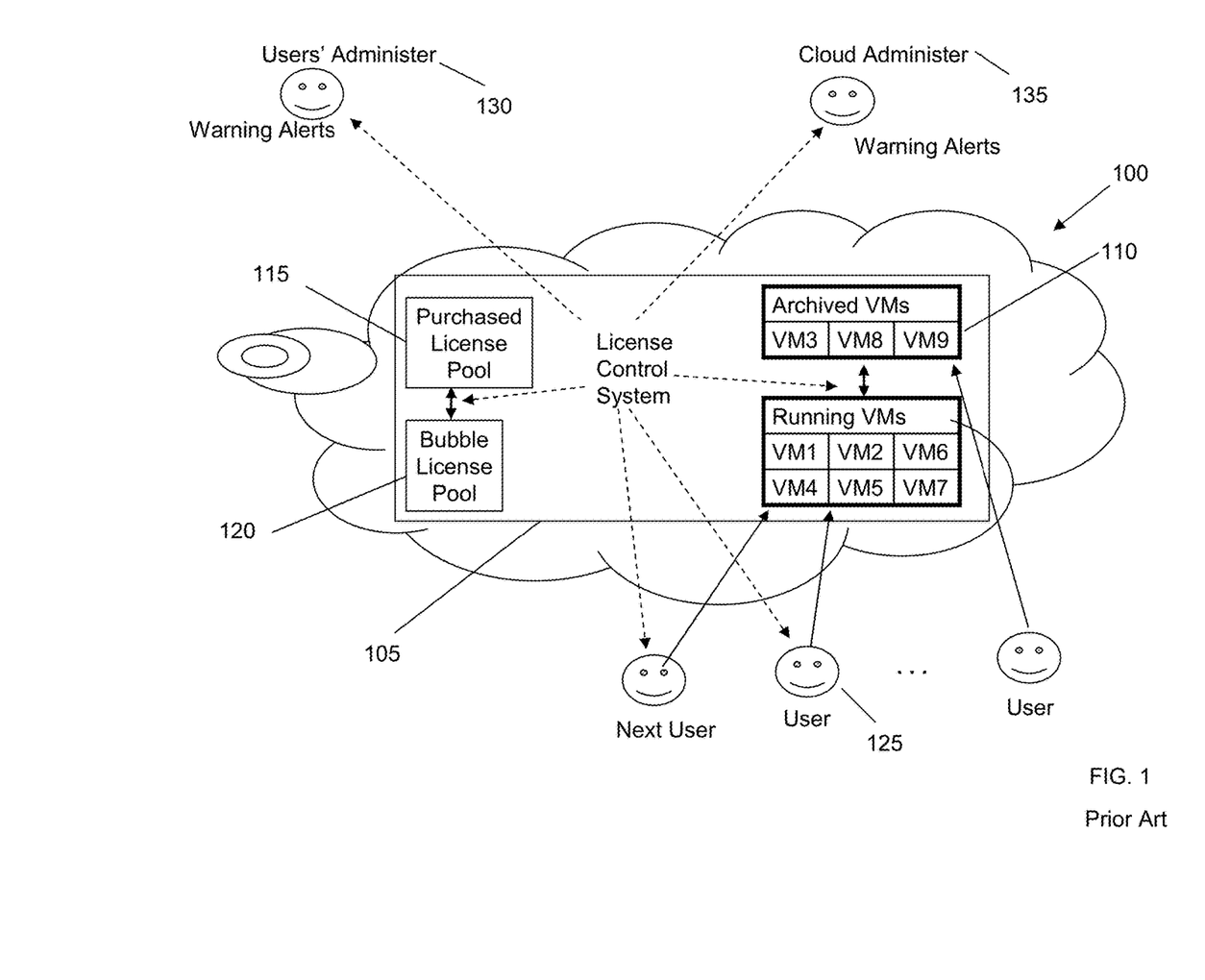
FIG. 1 is a schematic system diagram of a known license management system.

With reference now to FIG. 1, an existing cloud environment 100 comprises a license control system 105, which includes a plurality of virtual machines (VM1, VM2, . . . ) 110, a purchased license pool 115, and a bubble license pool 120. License management capabilities are limited, for example, in the ability to establish a quantity of licenses and to identify when licenses are exhausted. Typically, a quantity of licenses of a number of users 125 is purchased and additional licenses are required should a maximum threshold be reached. Warnings or alerts may be sent to a user administrator 130 and/or a cloud administer 135.

However, there remains a need to prioritize license usage by business function or value. The present invention provides an active license management environment with a license control system which monitors license usage, provides warning thresholds, prioritizes users based on importance of business function, and enables hibernation and restoration of functionality.

BRIEF SUMMARY

According to an aspect of the present invention, a method for allocation of application licenses is provided. A computing environment comprising a licensed application or service accessed by at least two users is established, each user having an associated computer system. An ordered list of users for the licensed application or service is established, in which users have a predefined priority based on a business value or function. At least one user attribute is established comprising whether a user's virtual machine will be archived and saved for later resumption if the user's license is at least one of suspended, removed, or reallocated. At least one disqualification threshold for at least one user is established.

According to another aspect of the present invention, a method for allocation of application licenses is provided comprising establishing a computing environment comprising a licensed application or service accessed by at least two users, each user having an associated computer system; establishing an ordered list of users for a licensed application or service, in which users have a predefined priority based on importance; establishing whether a user's virtual machine will be archived and saved for later resumption if the user's license is suspended or reallocated; determining a next license to remove comprising an active in-use license at a lowest part of the ordered list; informing the user of the next license to remove of a loss or suspension of the user's license; archiving the user's virtual machine; and reallocating the user's license to a next most important user.

According to another aspect of the present invention, a system for reallocation of application licenses is provided comprising a computer system/server for establishing a computing environment comprising a licensed application or service accessed by at least two users, each user having an associated computer system; a license management system comprising a plurality of virtual machines; and at least one client comprising a graphical user interface for displaying at least one message from the license management system.

According to another aspect of the present invention, a computer program product for allocation of application licenses is provided comprising a computer readable storage medium. First program instructions establish a computing environment comprising a licensed application or service accessed by at least two users, each user having an associated computer system. Second program instructions establish an ordered list of users for a licensed application or service, in which users have a predefined priority based on a business value or function. Third program instructions to establish at least one user attribute comprising whether a user's virtual machine will be archived and saved for later resumption if the user's license is at least one of suspended, removed, or reallocated. Fourth program instructions establish at least one disqualification threshold for at least one user. The first, second, third, and fourth program instructions are stored on the computer readable storage medium.

BRIEF DESCRIPTION OF SEVERAL VIEWS OF THE DRAWINGS

FIG. 6b is a continuation of FIG. 6a.

FIG. 6c is a continuation of the flowchart of FIG. 6a.

DETAILED DESCRIPTION

It is understood in advance that, although this disclosure includes a detailed description on cloud computing, implementation of the teachings recited herein are not limited to a cloud computing environment. Rather, embodiments of the present invention are capable of being implemented in conjunction with any other type of computing environment now known or later developed.

I. Cloud Computing

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for loadbalancing between clouds).

A cloud computing environment is service oriented with a focus on statelessness, low coupling, modularity, and semantic interoperability. At the heart of cloud computing is an infrastructure comprising a network of interconnected nodes.

Figure 2:
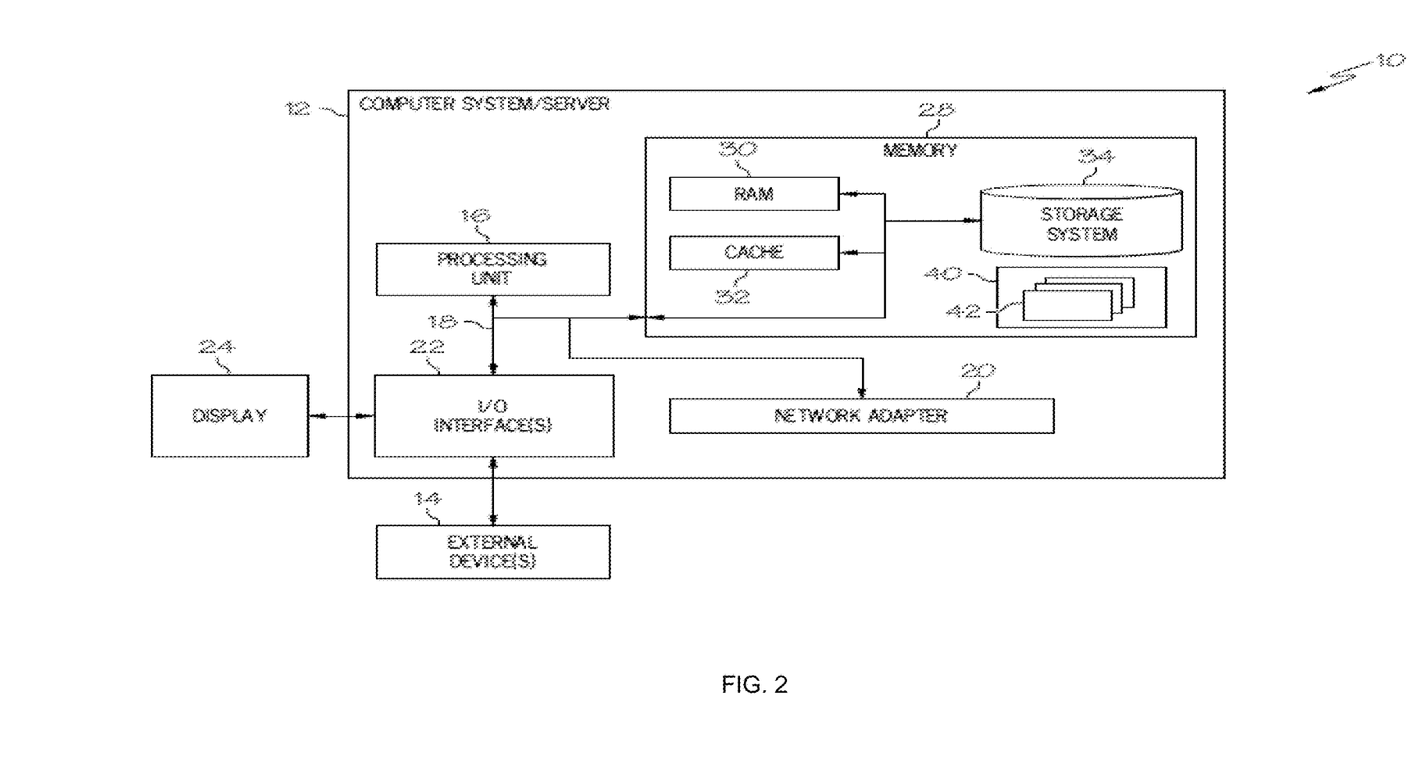
FIG. 2 depicts a cloud computing node according to an embodiment of the present invention.

Referring now to FIG. 2, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 2, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 3:
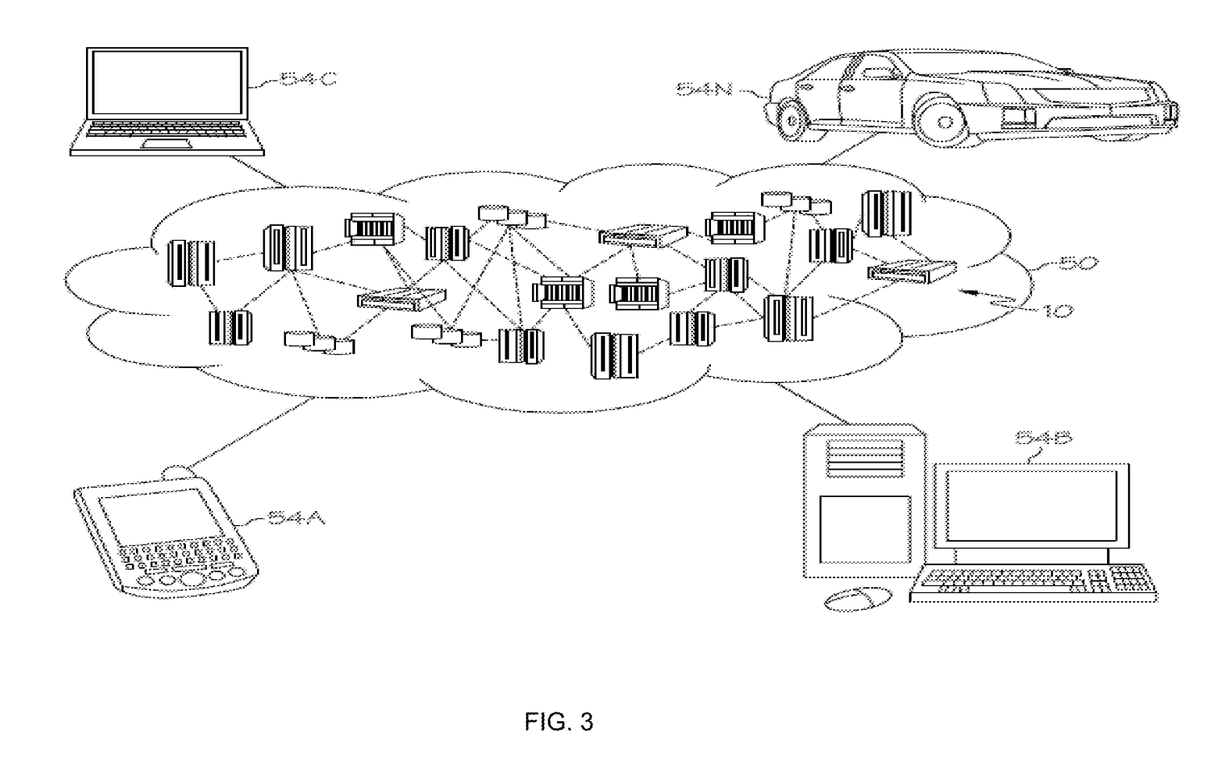
FIG. 3 depicts a cloud computing environment according to an embodiment of the present invention.

Referring now to FIG. 3, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 3 are intended to be illustrative only and that computing nodes 10 and cloud computing environment 50 can communicate with any type of computerized device over any type of network and/or network addressable connection (e.g., using a web browser).

Figure 4:
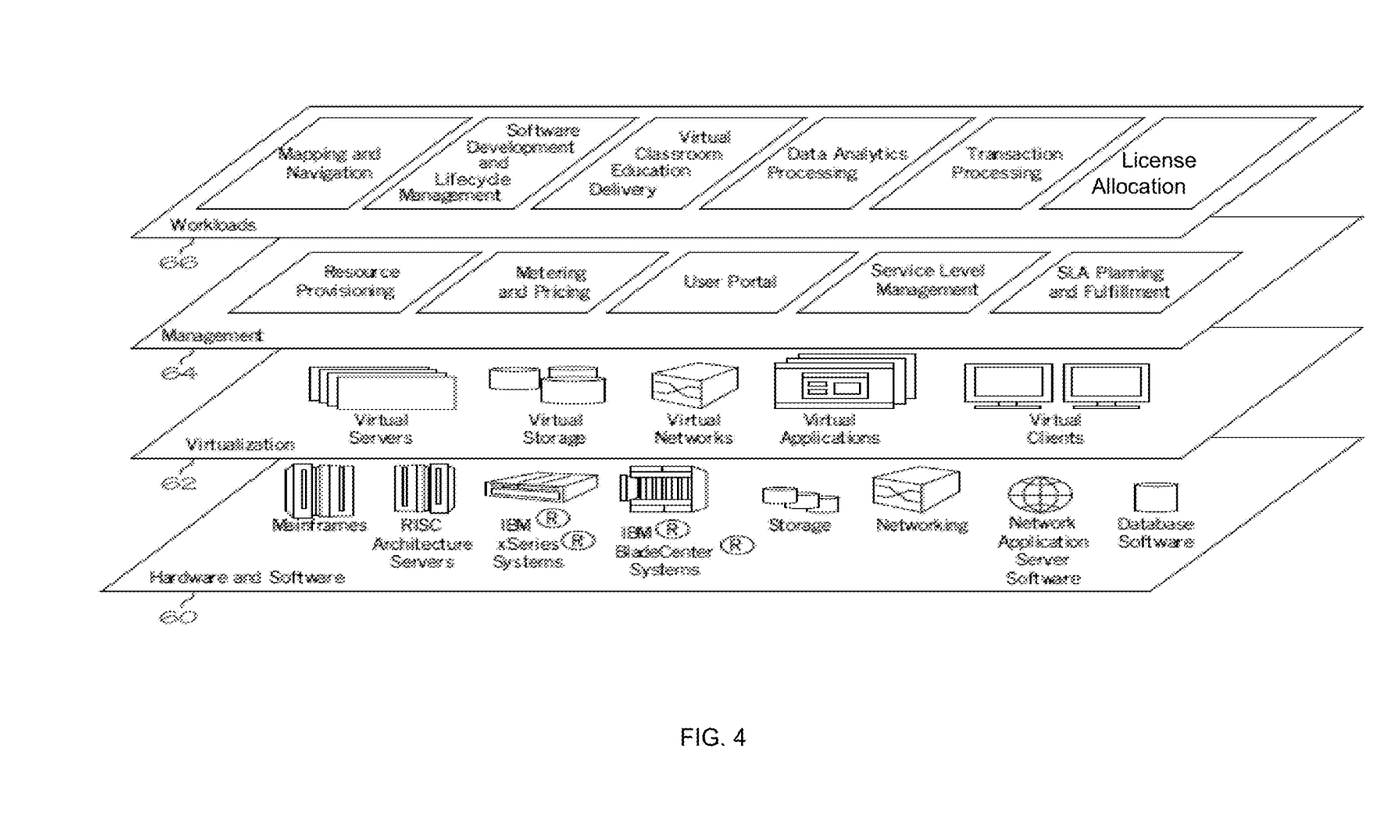
FIG. 4 depicts abstraction model layers according to an embodiment of the present invention.

Referring now to FIG. 4, a set of functional abstraction layers provided by cloud computing environment 50 (FIG. 3) is shown. It should be understood in advance that the components, layers, and functions shown in FIG. 4 are intended to be illustrative only and embodiments of the invention are not limited thereto. As depicted, the following layers and corresponding functions are provided:

Hardware and software layer 60 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and license allocation.

II. Detailed Implementation of Embodiments of Invention

According to the present invention, a system and methods are provided for monitoring license usage for an application or service and for the allocation and/or reallocation of licenses based on a business function or value (e.g., importance) of the current users and at least one next user of the application or service. In one or more embodiments, a list of potential users is ordered according to business function/value. Different users represent differing business value or importance. The optimization of business value by allocation of licenses may be based on at least one of user role, job, title, project, team, finance, salary, budget, group (e.g., human resources, administration, etc.) or security level.

In one or more embodiments, users of an application or service may also be prioritized upon entry into a computing environment based on predefined user attributes or characteristics. In specific embodiments, the predefined user attributes or characteristics may indicate a set of users whose work should be archived in the event a user should lose a license. For example, if an out-of-license condition exists, the present invention may enable notification and virtual machine hibernation for a user whose license is reallocated to a defined higher priority or more important user. In one or more embodiments, the user may later recover archived work when the user is allocated with a license again. This feature helps users achieve a positive experience with the present invention.

In one or more embodiments, the system and methods according to the present invention provide for communication of a notice or alert when at least one threshold has been reached, thereby enabling an administrator to take at least one action to manage the computing environment.

Figure 5:
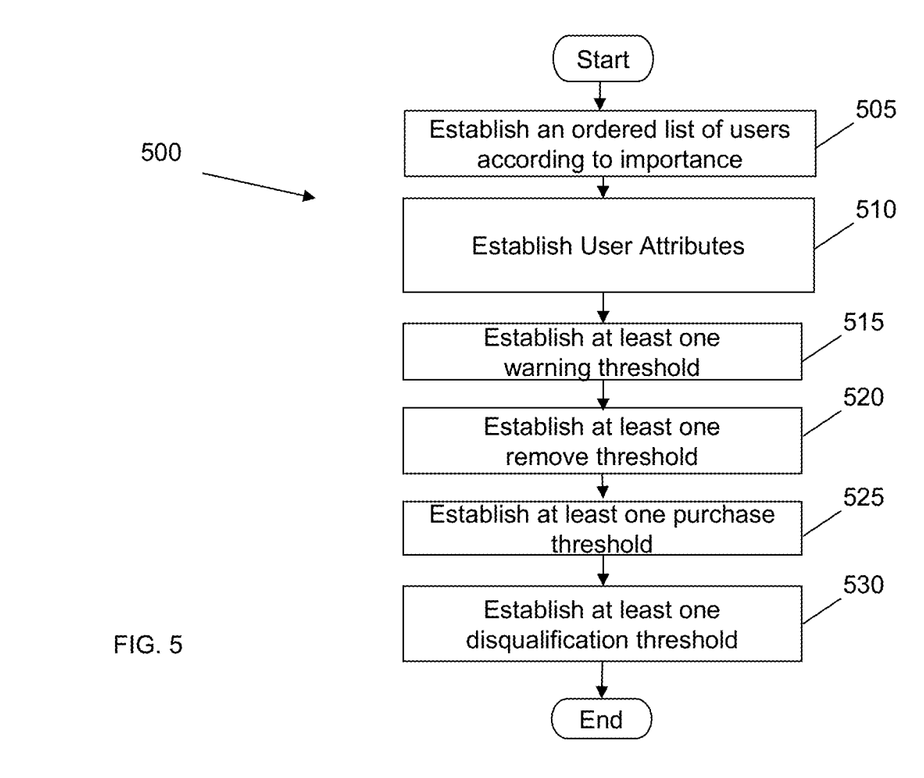
FIG. 5 is a flowchart of a method according to an embodiment of the present invention.

With reference now to FIG. 5, a flowchart of a method 500 according to an embodiment of the present invention is illustrated. In embodiments, a user administrator or a cloud administrator may perform any of the steps illustrated in FIG. 5.

An ordered list of users is established, 505. The ordered list comprises a predefined set of users that are authorized to utilize a licensed application or service and are ranked according to business function or value (importance). The predefined priority based on a business function or value may be represented as a table or list, for example, a top to bottom of list of ranked users. In one or more embodiments, the ordered list or a plurality of lists may automatically be changed or updated based on time of day.

User attributes are established, 510. In embodiments of the present invention, user attributes may comprise whether a user's virtual machine (VM) will be archived when the user's license is reallocated to a higher priority or more important user and saved for later restoration or resumption. Thus, the present invention allows not only for the removal of licenses from less important people and reallocation of such licenses to more important people, but also for the restoration of a full, archived computing environment of a less important person at a later time.

At least one warning threshold is established, 515. In one or more embodiments, the at least one warning threshold may comprise a percent of utilization of licenses at which a user administrator and/or cloud administrator receive an alert or notification for possible action.

At least one remove threshold is established, 520. The at least one remove threshold may comprise a defined level at which a less important user is removed from the application or service in favor of a more important next user. In a specific embodiment, this level may be set to 100% utilization of available licenses. In one or more embodiments, the at least one warning threshold may comprise the at least one remove threshold.

At least one purchase threshold is established, 525. In one or more embodiments, the at least one purchase threshold may comprise a warning level at which a user administrator is alerted to purchase or order additional licenses, prior to exhausting a current supply or prior to entering into a removal mode (e.g., triggering the at least one remove threshold).

At least one disqualification threshold is established, 530. The at least one disqualification threshold may be based on at least one of a time; duration; location or geography; or device condition. For example, if a license can be given only when a user is at a campus location (e.g., not a remote location), the defined priority of the user does not change while traveling, but the user may be disqualified to receive a license if he or she is at a remote location. Similarly, if a user has multiple different device endpoints, and a license can be allocated only when the user is not using one or more specified pieces of equipment, the defined priority of the user does not change when moving from one piece of equipment to another, but for some equipment the user may be disqualified from receiving a license. In one or more embodiments, a disqualification condition may exist for a short period of time and may temporarily disqualify a "next user" in the ordered list, but the ordered list would not change.

Thus, in one or more embodiments, a cloud license management system according to the present invention tracks the number of licenses in-use, sends alerts when at least one threshold is reached, and takes action when the at least one threshold is exceeded, which may include disconnecting a low priority user and, where specified, archiving data for future use. The system and methods according to the present invention may also enable additional licenses to be purchased and the reconnection of users once such licenses are available.

Figure 6A:
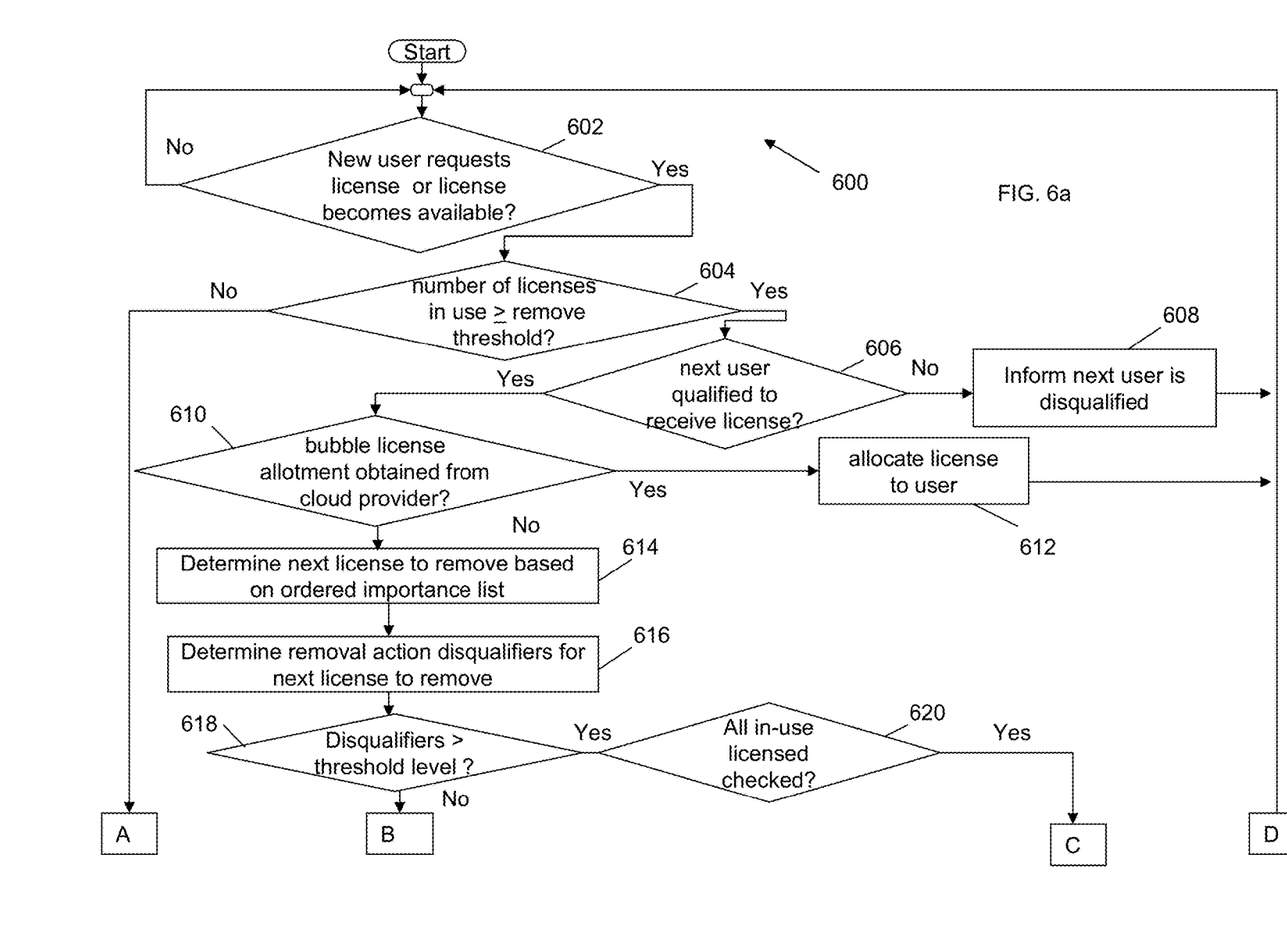
FIG. 6a is a flowchart of another method according to an embodiment of the present invention.

With reference now to FIG. 6a, a flowchart of a method 600 according to an embodiment of the present invention is illustrated in which a number of users are utilizing an application or service (e.g., a cloud service) with a set number of licenses. A new user ("next" user) requests a license or a license becomes available, 602. The number of licenses in-use is compared to at least one remove threshold, 604. If the at least one remove threshold is exceeded, it is determined whether the next user is qualified to receive a license, 606. If the next user is not qualified to receive a license, he or she is informed of the disqualification, 608.

If the next user is qualified to receive a license, it is determined whether a bubble license allotment obtained from a cloud provider is available, 610. According to an embodiment of the present invention, a supplier/provider of the cloud or infrastructure may provide a "bubble" of licenses over and above a committed number of license for a period of time, usually a pre-defined period of time as part of the service. After a normal license pool is consumed, a next qualified user would get a license from the "bubble" pool. When the license is no longer needed, it is returned to the bubble pool. The bubble pool may be shared among multiple users or tenants of the infrastructure. The duration of the bubble license can be for a pre-defined time. If a bubble license is available, it is allocated to the new user (next user), 612.

If a bubble license is not available, the next license to remove based on the ordered importance list is determined, 614. Accordingly, the next license to remove comprises an active in-use license at the lowest part of the predefined priority (importance) list.

It is determined whether there are any removal action disqualifiers for the next license to remove, 616. If the removal action disqualifiers are greater than at least one threshold level, 618, all in-use licenses are checked, 620.

Figure 6B:
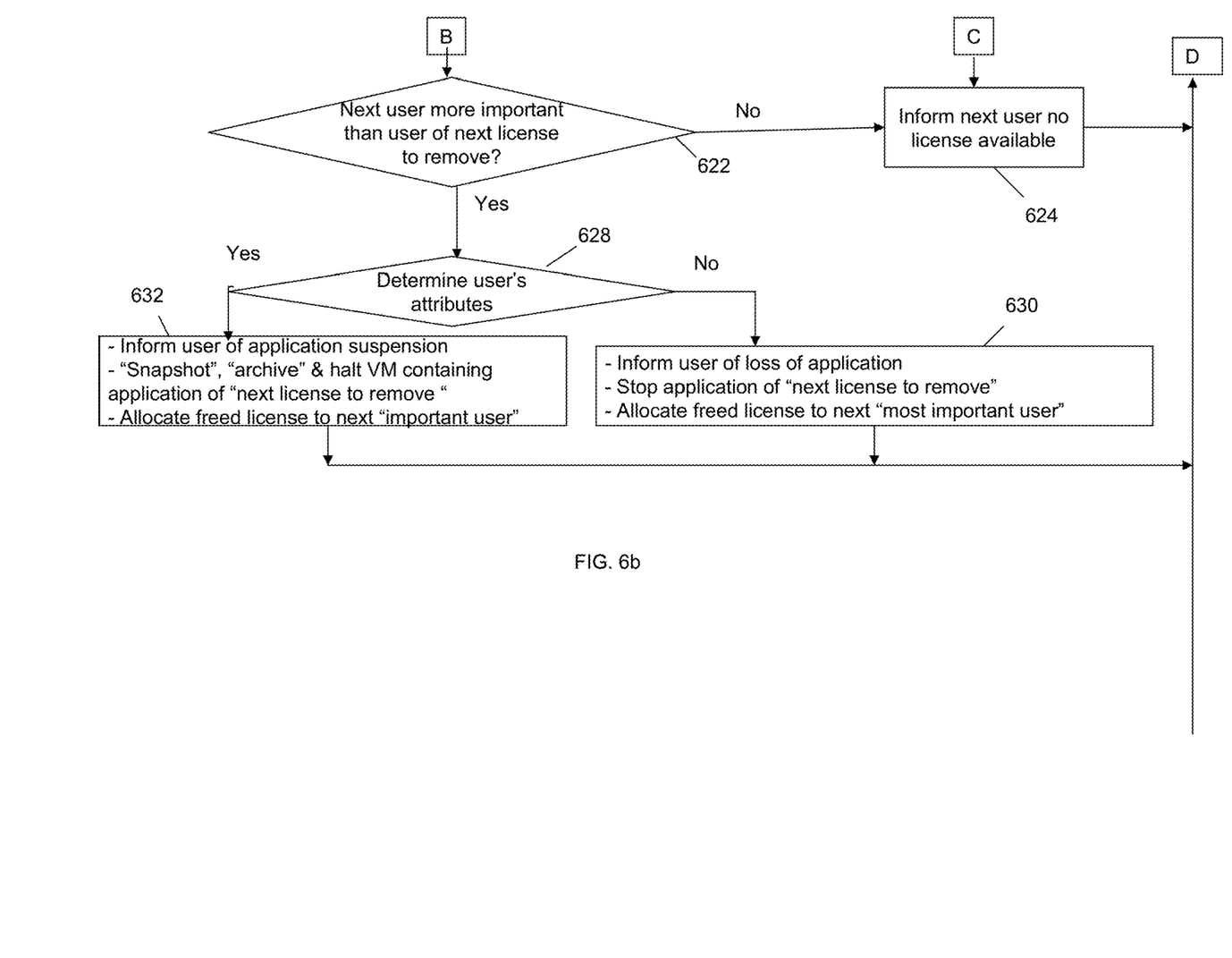

With reference now to FIG. 6b, if the removal action disqualifiers are less than the at least one threshold level, it is determined whether the next user is more important than the user of the next active in-use license to remove, 622. If the next user is not more important than the next license to remove, he or she is informed that no licenses are currently available, 626.

If the next user is more important than the user of the next active in-use license to remove, the user of the next license to remove's attributes are determined, 628. If the user attributes do not warrant saving and archiving their VM, the user of the next license to remove is informed of the loss or suspension of application (e.g., via a message in a graphical user interface); the application is stopped; and the now-freed license is allocated to the next most important user, 630. The next important user is based on the position in the importance list and may also be the order in which restoration or resumption is completed. If the user of the next license to remove's attributes warrant saving and archiving their VM, the user of the next license to remove is informed of application loss or suspension (e.g., via a message in a graphical user interface); a snapshot or archive of their virtual machine is made; and the now-freed license is allocated to the next most important user, 632.

According to an embodiment of the present invention, a function may protect a user whose license is removed from getting denied license usage multiple times during a given time period. For example, a user's priority or importance may be increased with each disconnection or after a threshold of disconnections within a time period, so that he or she will not be disconnected more than "n" times per time period.

Figure 6C:
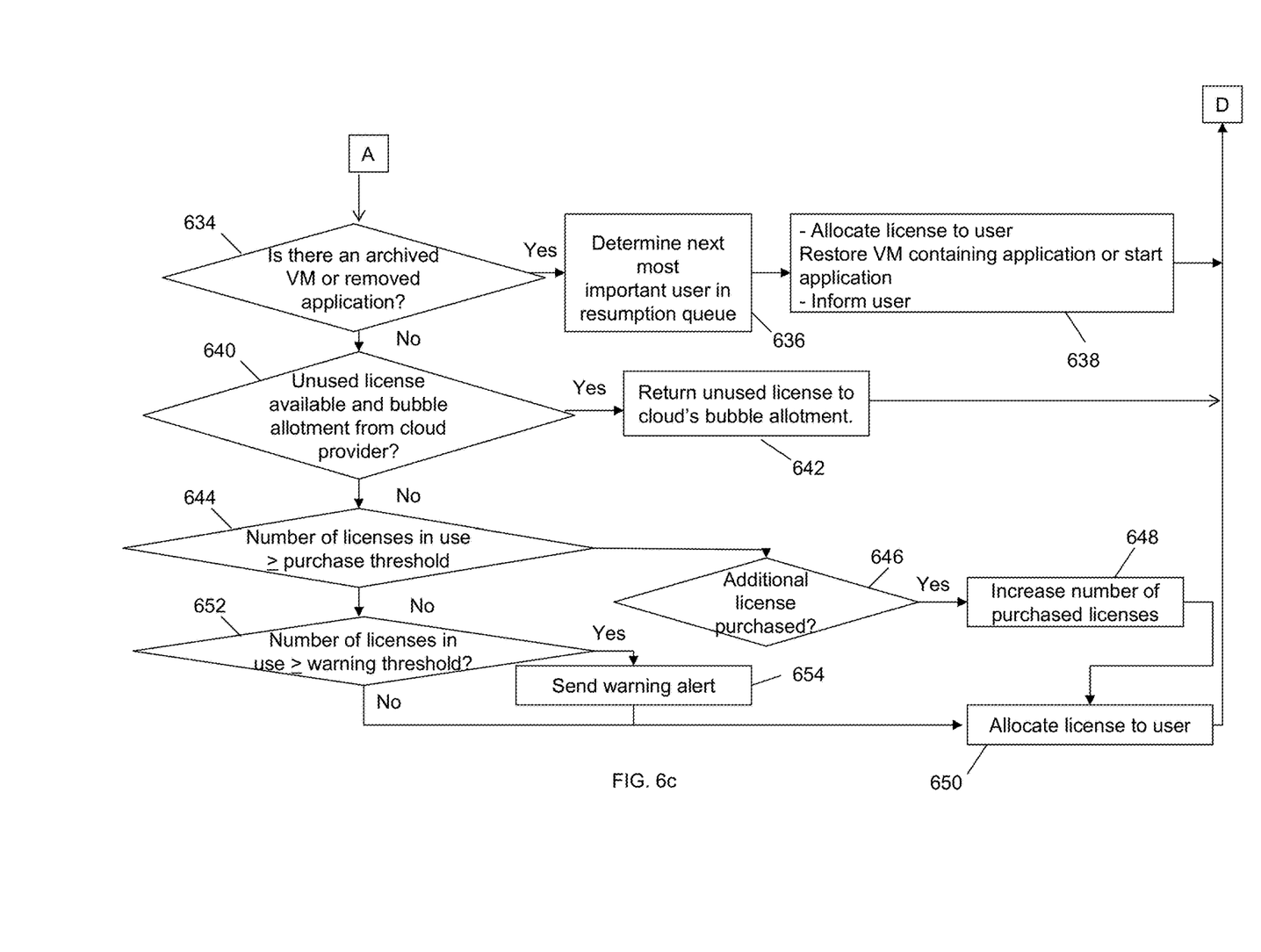

With reference now to FIG. 6c, if the number of licenses in-use does not exceed the at least one remove threshold (see 604 in FIG. 6a), it is determined whether there is an archived VM or removed application, 634. If so, the next most important user in a "resumption queue" is determined, 636. The resumption queue comprises users and VM data that were halted due to a out-of-license determination (see 632 in FIG. 6b). More important users are placed in the resumption queue based on priority in the ordered list of users and when a license is available they are restored. A license is allocated to the first user in the resumption queue, thereby restoring their VM containing application or starting the application, and informing the user, 638.

If there is no archived VM or removed application, it is determined whether an unused license is available and if there is a bubble allotment from a cloud provider, 640. If so, the unused license is returned to the cloud's bubble allotment, 642.

If an unused license is not available and there is no bubble allotment, it is determined whether the number of licenses in-use greater than or equal to the at least one purchase threshold, 644, and whether at least one additional license should be purchased, 646. If one or more additional licenses are purchased, 646, the number of purchased licenses is increased, 648, and a license is allocated to the new user, 650.

If the number of licenses in-use does not exceed the at least one purchase threshold, it is determined whether the number of licenses in-use is greater than the at least one warning threshold, 652. If so, a warning alert is sent to an administrator, 654. In one or more embodiments, the alert may be sent to an administrator or cloud administer via at least one of a text, email, or cell notification. Similarly, text, email, or cell notification may be sent to a removed or archived user that a license has become available and providing a guaranteed license for a duration of time if they reconnect.

Figure 7:
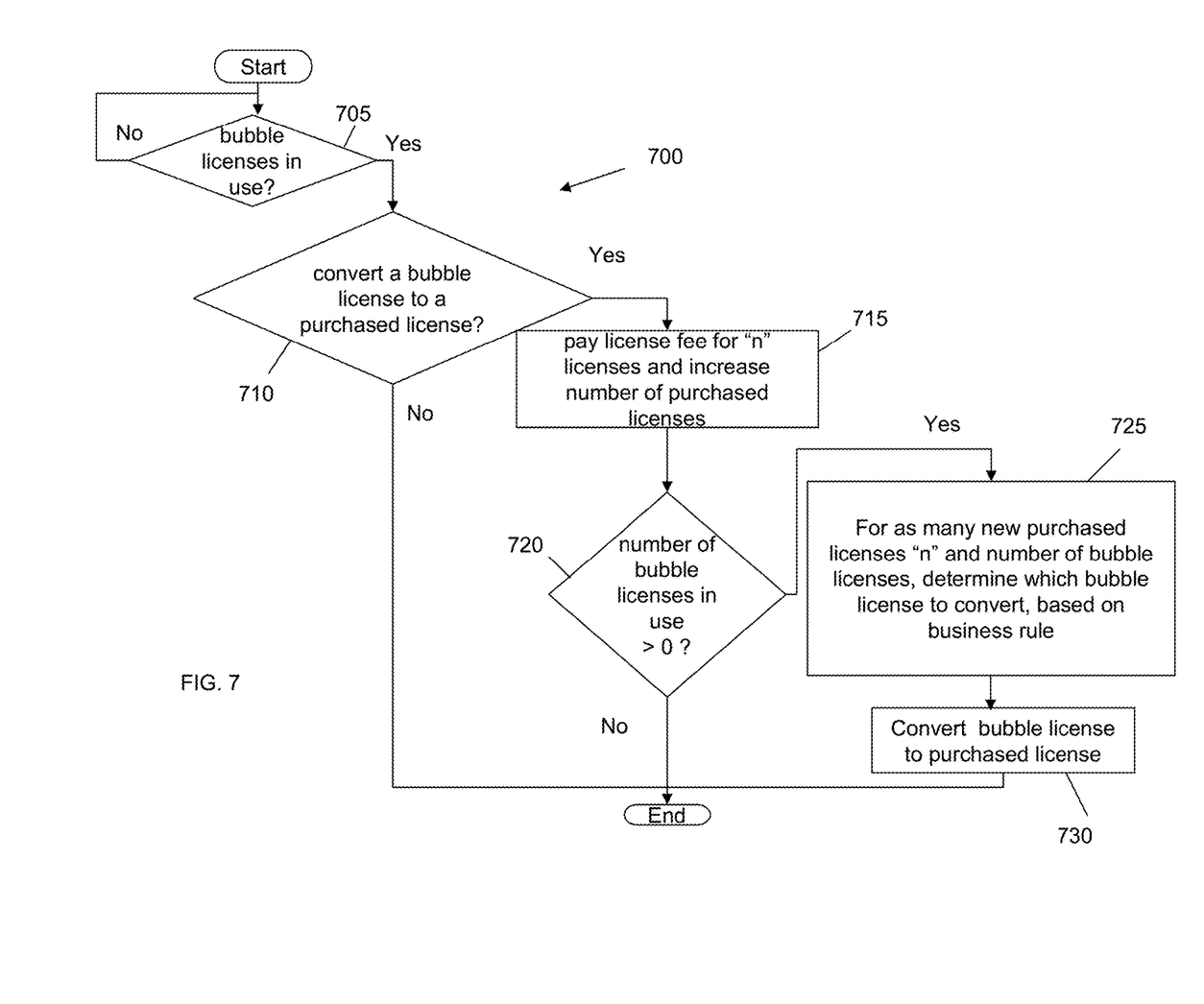
FIG. 7 is a flowchart of another method according to an embodiment of the present invention.

With reference now to FIG. 7, a method 700 according to another embodiment of the present invention is illustrated. It is determined whether bubble licenses are in use, 705. If so, it is determined if an administrator desires to convert a bubble license to a purchased license, 710. If the administrator desires to do so, a license fee is paid for "n" licenses and the number of purchased licenses is increased, 715. If the number of bubble licenses in use is greater than zero, 720, for each new purchased license "n" and the number of bubble licenses, it is determined which bubble licenses to convert based on a business rule (e.g., priority of user), 725. The respective bubble license is converted to a purchased license, 730. Although not illustrated, it would be readily understood that the total number of bubble licenses in a pool may be reduced and the maximum number of bubble licenses may be increased.

A bubble licensee may be charged substantially more than a license from a normal pool. In an embodiment, a cloud administrator may set the cost for a bubble license, valid for a specific time, to be less than the cost to purchase a license. However, if a user administrator anticipates that a license will be in use for a longer period, then the cost to purchase a license may be less than the ongoing cost for repeatedly obtaining a bubble license. For example, the purchase of a license may cost $100 per year and a bubble license may cost $45 for 1 month usage. If a user only uses a service 2 times within the next year, a bubble approach ($90) is more cost effective than the purchase of the $100 per year license. However, if the user currently using a bubble license anticipates that the license would be needed for a longer period of time, it may be desirable to convert the bubble license to a purchased license.

According to a specific embodiment of the present invention, a bubble license may be converted to a standard license after a defined period or on a specific date (e.g., the last day of the month).

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 8:
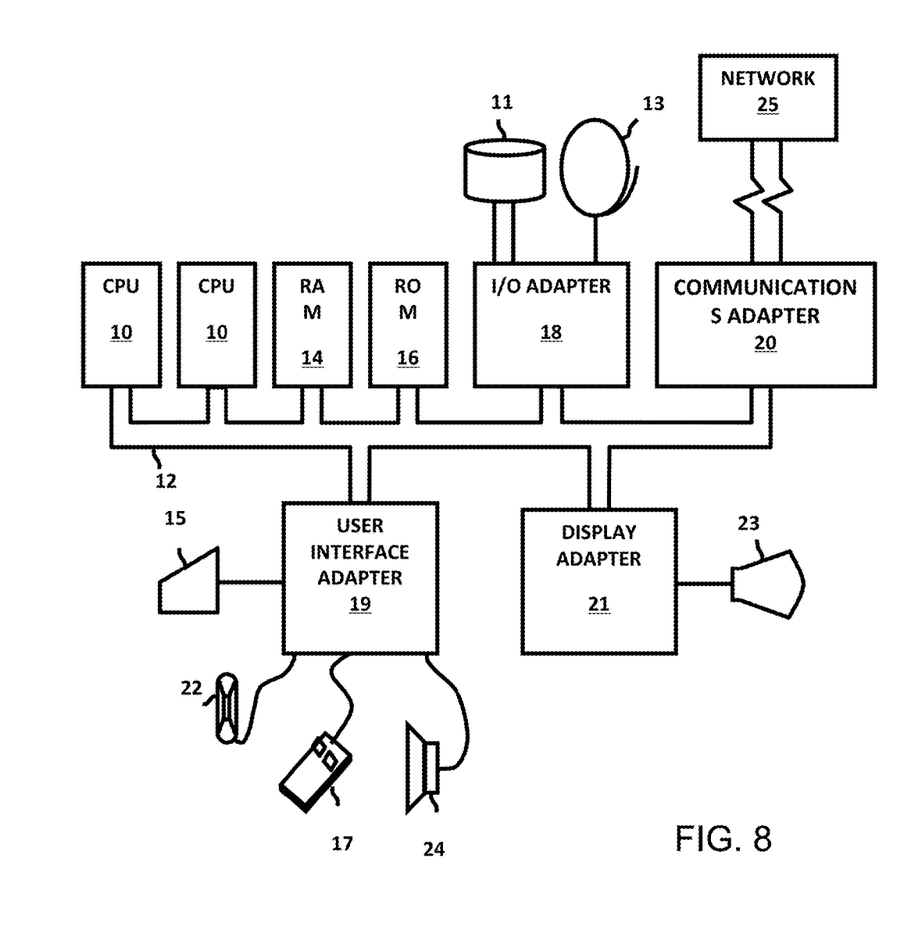
FIG. 8 is a schematic diagram of a system according to an embodiment of the present invention.

Referring now to FIG. 8, a representative hardware environment for practicing at least one embodiment of the invention is depicted. This schematic drawing illustrates a hardware configuration of an information handling/computer system in accordance with at least one embodiment of the invention. The system comprises at least one processor or central processing unit (CPU) 10. The CPUs 10 are interconnected with system bus 12 to various devices such as a random access memory (RAM) 14, read-only memory (ROM) 16, and an input/output (I/O) adapter 18. The I/O adapter 18 can connect to peripheral devices, such as disk units 11 and tape drives 13, or other program storage devices that are readable by the system. The system can read the inventive instructions on the program storage devices and follow these instructions to execute the methodology of at least one embodiment of the invention. The system further includes a user interface adapter 19 that connects a keyboard 15, mouse 17, speaker 24, microphone 22, and/or other user interface devices such as a touch screen device (not shown) to the bus 12 to gather user input. Additionally, a communication adapter 20 connects the bus 12 to a data processing network 25, and a display adapter 21 connects the bus 12 to a display device 23 which may be embodied as an output device such as a monitor, printer, or transmitter, for example.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method for allocation of application licenses, comprising:
    establishing a cloud computing environment, the cloud computing environment having an application or service with a set number of licenses accessed by a plurality of users, each user having an associated computer system;
    establishing an ordered list of users for the application or service, wherein the users have a predefined priority based on a business value or function;

generating one or more virtual machines and granting to respective users, via processing circuitry of the cloud computing environment, access to the application or service via the one or more virtual machines based on respective licenses accessed by respective users as a function of the established ordered list;

establishing user attributes, the user attributes indicating whether a user's virtual machine is archived and saved for later resumption when the user's license is lost;

establishing at least one remove threshold comprising a level at which an active in-use license of a lower priority user in the ordered list is lost and reallocated to a higher priority user in the ordered list;

determining, when the at least one remove threshold is exceeded, a next license to remove comprising an active in-use license at a lowest part of the ordered list;

determining the user attributes of the next license to remove;

informing the user of the next license to remove of a loss of the user's license and archiving the user's virtual machine based on the user attributes;

disconnecting from the cloud computing environment the user and archiving the virtual machine of the user;

reallocating the user's lost license to a higher priority user on the ordered list; and generating, at the cloud computing environment, a virtual machine for the higher priority user and granting access based on the user's lost license to the application or service via the virtual machine.

2. A method according to claim 1, wherein the business value or function for at least one user in the ordered list is based on at least one of user role, job, title, project, team, finance, salary, budget, group, or security level.

3. A method according to claim 1, further comprising establishing at least one disqualification threshold for disqualifying a license for at least one user based on at least one of a time, duration, geographic location of the at least one user, device endpoint of the at least one user, or device condition for use of the application or service.

4. A method according to claim 1, further comprising establishing at least one purchase threshold, wherein when the at least one purchase threshold is triggered, a text, email, or cell notification is sent to an administrator to order at least one additional license.

5. A method according to claim 1, further comprising establishing a resumption queue of users and virtual machine data for users whose licenses are lost and reallocated.

6. A method according to claim 5, wherein when a license becomes available, said method further comprises:
   determining a higher priority user in the resumption queue;
   allocating the license to the higher priority user in the resumption queue; and
   restoring the higher priority user's archived virtual machine.

7. A method according to claim 1, further comprising increasing a user's predefined priority on the ordered list each time the user's license is lost within a set time period.

8. The method according to claim 1, further comprising generating a message in a graphical user interface to inform the user of the next license to remove of the loss of the user's license.

9. The method according to claim 1, further comprising establishing a table or list to rank the ordered list of users.

10. A non-transitory computer-readable medium having computer-readable instructions stored thereon which when executed by a computer cause the computer to perform a method for allocation of application licenses, the method comprising:
   establishing a cloud computing environment, the cloud computing environment having an application or service with a set number of licenses accessed by a plurality of users, each user having an associated computer system;
   establishing an ordered list of users for the application or service, wherein the users have a predefined priority based on a business value or function;
   generating one or more virtual machines and granting to respective users, via processing circuitry of the cloud computing environment, access to the application or service via the one or more virtual machines based on respective licenses accessed by respective users as a function of the established ordered list;
   establishing user attributes, the user attributes indicating whether a user's virtual machine is archived and saved for later resumption when the user's license is lost;
   establishing at least one remove threshold comprising a level at which an active in-use license of a lower priority user in the ordered list is lost and reallocated to a higher priority user in the ordered list;
   determining, when the at least one remove threshold is exceeded, a next license to remove comprising an active in-use license at a lowest part of the ordered list;
   determining the user attributes of the next license to remove;
   informing the user of the next license to remove of a loss of the user's license and archiving the user's virtual machine based on the user attributes;
   disconnecting from the cloud computing environment the user and archiving the virtual machine of the user;
   reallocating the user's lost license to a higher priority user on the ordered list; and
   generating, at the cloud computing environment, a virtual machine for the higher priority user and granting access based on the user's lost license to the application or service via the virtual machine.

* * * * *